(12) United States Patent
Klingenbrunn et al.

(10) Patent No.: US 7,269,234 B2
(45) Date of Patent: Sep. 11, 2007

(54) ARRANGEMENT FOR DYNAMIC DC OFFSET COMPENSATION

(75) Inventors: Thomas Klingenbrunn, San Diego, CA (US); Lichung Chu, San Diego, CA (US); Antoine J. Rouphael, Escondido, CA (US); Benny Veilgaard, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 1134 days.

(21) Appl. No.: 10/173,447

(22) Filed: Jun. 14, 2002

(65) Prior Publication Data

US 2003/0231662 A1 Dec. 18, 2003

(51) Int. Cl.
*H04L 27/06* (2006.01)

(52) U.S. Cl. ........................................................ 375/340

(58) Field of Classification Search ................ 375/148, 375/224, 233, 285, 340, 341, 346, 348
See application file for complete search history.

(56) References Cited

U.S. PATENT DOCUMENTS

| | | | | |
|---|---|---|---|---|
| 5,432,754 A | * | 7/1995 | Brady et al. | 367/134 |
| 5,581,580 A | * | 12/1996 | Lindbom et al. | 375/340 |
| 5,822,380 A | * | 10/1998 | Bottomley | 375/347 |
| 6,504,884 B1 | * | 1/2003 | Zvonar | 375/346 |
| 6,725,024 B1 | * | 4/2004 | Lindoff et al. | 455/255 |
| 2002/0159547 A1 | * | 10/2002 | Lindoff et al. | 375/343 |
| 2002/0173286 A1 | * | 11/2002 | Lindoff et al. | 455/295 |

OTHER PUBLICATIONS

Lindoff, Bengt; "Using a Direct Conversion Receiver in Edge Terminals—A New DC Offset Compensation Algorithm"; Ericsson Mobile Communications AB, 11$^{th}$ IEEE International Symposium on Personal, Indoor and Mobile Radio Communications, 2000, vol. 2, pp. 959,963.
Digital cellular telecommunications system (Phase 2+); Radio transmission and reception (GSM 05.05 version 8.5.0 Release 1999); ETSI EN 300 910 V8.5.0 (Jul. 20007) European Standard (Telecommunications series); Global System for Mobile Communications, pp. 1-107.

* cited by examiner

Primary Examiner—Young T. Tse

(57) ABSTRACT

A digital arrangement for selecting a channel coefficient and DC estimate comprises a demultiplexer receiving a digital input signal splitting the digital input signal into a first and second signal, a first joint detection unit receiving the first signal generating a first channel coefficient and DC estimate, a second joint detection unit receiving the second signal generating a second channel coefficient and DC estimate, a first and second error determination unit receiving the first and second channel coefficients and DC estimates, respectively for generating a first and second error signal, a decision unit receiving the first and second error signals generating a control signal, and a selection unit controlled by the control signal for selecting the first or second channel coefficient and DC estimate.

22 Claims, 2 Drawing Sheets

ARRANGEMENT FOR DYNAMIC DC OFFSET COMPENSATION

BACKGROUND OF THE INVENTION

The present invention relates generally to digital signal detector arrangements and in particular to a dynamic DC offset compensation arrangement in wireless systems.

Wireless technology provides multiple applications for voice and/or data transmission. Today's cell phone networks offer customers a plurality of services including digital data services, such as digital email, Internet access, etc. In future applications, such as third generation wireless networks, a plurality of new digital data services will be provided. In particular, Internet applications will be highly improved and made more practical, for example, via high speed digital data transmission. Other digital data application, not yet applicable in today's wireless transmission technology, will be adapted and implemented.

High speed wireless data applications require high data throughput at a significantly lower bit error rate than voice applications. Bit errors in voice applications are usually easy to recover or do not need to be fully recovered due to redundancy capabilities of the human ear; whereas, digital data applications often highly rely on the correctness of the submitted data. The quality of data transmissions in a digital environment highly depends on the quality of the transmission channel. Under severe channel conditions, the mobile device throughput is markedly affected due to retransmission of erroneous data packets, thus affecting the entire network throughput. This situation may be ameliorated by the use of antenna diversity and more sophisticated signal processing algorithms.

According to the prior art, decision feedback equalizers are used to compensate for the effects of the transmission channel, which can vary depending on the environment. A basic decision feedback equalizer (DFE) has a forward filter, a feedback filter, and a decision device. Decision feedback equalizers are effective against severe intersymbol-interference. Intersymbol-interference is an effect which creates distortion of the transmitted signal in a specific way. In a sequence of positive and negative symbol pulses, intersymbol-interference is the distortion of a symbol pulse within a particular symbol period caused by the smearing or spillover of symbol pulses of preceding and/or succeeding adjacent symbol pulses into the particular symbol period. The spillover of the preceding and/or succeeding symbol pulses will add to or subtract from the symbol pulse in the particular symbol interval, depending upon whether the adjacent interfering symbol pulses are positive or negative in value. In applications with mobile devices, intersymbol-interference occurs due to the multi-path profile of the mobile channel as well as the above mentioned smearing generated due to analog filtering. Unlike linear equalizers, decision feedback equalizers' decision errors propagate in the feedback branch, thus affecting the outcome of future bit decisions.

In digital communication receivers, an important problem is that of estimating the channel impulse response in the presence of a DC offset. In communication systems using frequency hopping, this needs to be done without knowledge about previous bursts. If the DC offset is constant throughout the burst, several techniques exist to remove the offset and subsequently perform the channel impulse response estimation (for example, by averaging the signal or least square circular fitting of the signal). Another option is the joint detection of DC and the channel impulse response, which seems to work particularly well for non-constant envelope signals. A special case is represented by the GSM 05.05 AM suppression test, which specifies an interfering source which starts transmission within the training sequence. The non-linearities in the front-end result in a DC step occurring inside the training sequence. In such a case, conventional DC estimation will fail and the subsequent channel impulse response estimation will lead to a corrupted channel impulse response, causing equalization to fail.

From the above, it is seen that it is desirable to provide compensation for a digital signal detector arrangement which considers DC offsets within a burst.

SUMMARY OF THE INVENTION

According to a specific embodiment, the present invention provides a digital arrangement for selecting a channel coefficient and DC estimate. The digital arrangement includes a demultiplexer receiving a digital input signal and splitting the digital input signal into a first and second signal, a first joint detection unit receiving the first signal and generating a first channel coefficient and DC estimate, and a second joint detection unit receiving the second signal and generating a second channel coefficient and DC estimate, a first and second error determination unit receiving the first and second channel coefficients and DC estimates, respectively for generating a first and second error signal, a decision unit receiving the first and second error signal generating a control signal, and a selection unit controlled by the control signal for selecting the first or second channel coefficient and DC estimate.

According to another specific embodiment, the present invention provides a method of selecting a channel coefficient for a signal estimation. The method includes the steps of splitting an incoming digital signal into a first and second signal, determining a first and second channel coefficient and DC estimate with respect to the first and second signal, and determining a first and second error signal with respect to the first and second channel coefficient and DC estimate. The method also includes the step of selecting the first or second coefficient and DC estimate depending on the first and second error signal.

A more complete understanding of these and other specific embodiments of the present invention and advantages thereof may be acquired by referring to the following description in conjunction with the accompanying drawings, in which like reference numbers indicate like features.

DETAILED DESCRIPTION OF THE SPECIFIC EMBODIMENTS

The present invention can be implemented in wireless apparatus including a digital signal detector arrangement. Wireless apparatus can be wireless devices, wireless phones, or wireless infrastructure equipment. The detector arrangement can be implemented within a digital signal processor. The digital arrangement can further include an average unit receiving the first and second coefficient and DC estimate for generating an average coefficient and DC estimate, wherein the selection unit selects the first, second or average coefficient and DC estimate. The error determination unit can comprise a re-modulator receiving the respective first or second coefficient and DC estimate and a training signal for generating a re-modulated signal and may further comprise a subtractor for subtracting the re-modulated signal from the respective first or second signal for generating an error signal. Furthermore, a mean square error unit receiving a sequence of the error signal for generating a mean square error signal can be provided, wherein the mean square error signal is fed to the decision unit. A demultiplexer can be provided which receives a position estimate signal for splitting the digital signal. The estimate signal can be generated by correlation.

According to the present invention, the proposed method and arrangement perform two independent runs of a joint detection algorithm on respectively the first and the last half of the training sequence. The training sequence is specific sequence which is transmitted from and/or to the base station to and/or from the mobile station during a transmission burst. The purpose of such a training sequence is to determine the channel characteristics and determine parameters for adaptive filters to compensate for channel insufficiencies. To this end, the training sequence is known to the receiver and, thus, the receiver can perform a channel estimation, determine a frequency offset and/or DC offset, and other parameters, etc.

Figure 1:
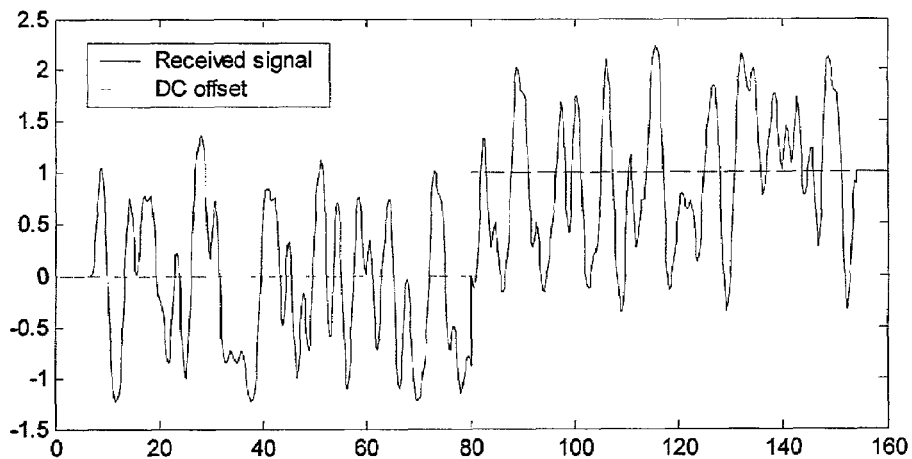
FIG. 1 shows an exemplary burst signal including a DC offset.

FIG. 1 shows an example of a received signal (indicated as a continuous line) during a training sequence. As seen in FIG. 1, this received signal is subject to a DC offset (indicated by a dotted line) occurring approximately in the middle of the training sequence.

Figure 2:
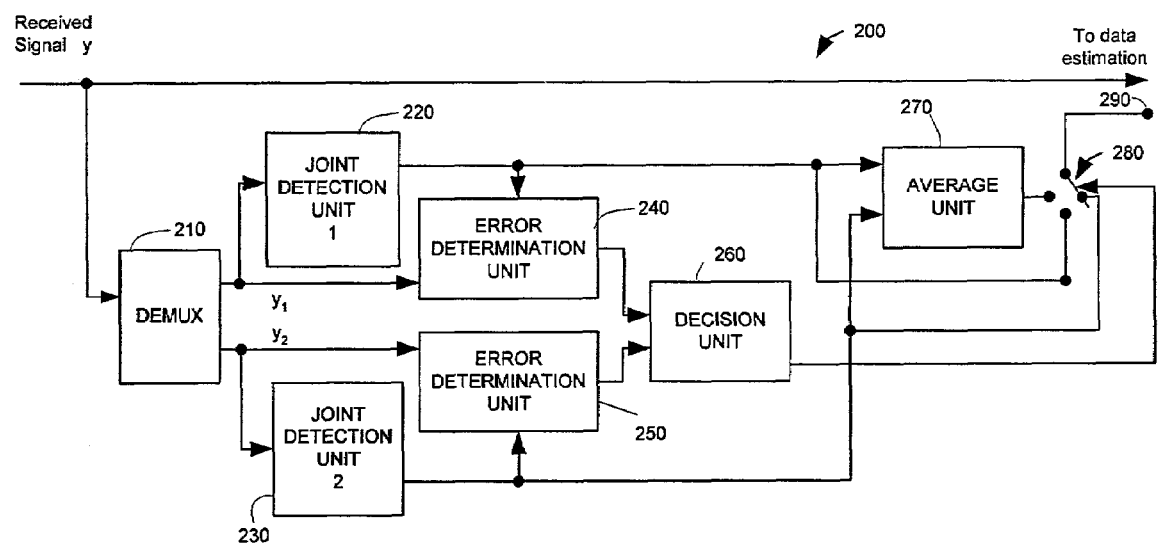
FIG. 2 shows a block diagram of a specific embodiment according to the present invention.

FIG. 2 shows an exemplary embodiment of a digital detector arrangement which is capable of properly handling such a DC offset in the received signal. The received signal y that is to be estimated is also fed to a demultiplexer 210. Demultiplexer 210 splits, with respect to time, the signal y into two parts $y_1$ and $y_2$ which are fed to the inputs of a first joint detector unit 220 and a second joint detector unit 230, respectively. In particular, demultiplexer 210 provides the first half $y_1$ of the incoming sequence to joint detector unit 220 and the second half $y_2$ of the incoming sequence to joint detector unit 230. The joint detector units each apply the joint DC and channel impulse response detection algorithm, as will be described in more detail below, to the respective signal parts $y_1$ and $y_2$. The input signals fed to joint detector units 220 and 230 are also fed to the input of error determination units 240 and 250, respectively. Error determination units 240 and 250 also receive the output signals of joint detector units 220 and 230 to re-modulate the training sequence and subtract the re-modulated signals from the received signal parts to generate respective error signals. Error determination units 240 and 250 thus generate error signals that are fed to a decision unit 260 which controls a switch 280. Average unit 270 receives the output signals from joint detector units 220 and 230 and averages these signals. Decision unit 260 determines and controls which input signal to switch 280 is output by switch 280 to terminal 290. Switch 280 receives as inputs signals from the output of joint detector unit 220, from the output of joint detector unit 230, and the output of an average unit 270.

Decision unit 260 determines the signal that switch 280 outputs to terminal 290 in the following manner. If the mean square error of the two error signals generated by error determination units 240 and 250 differ significantly, then the signal part with the larger mean square error is the most likely one to experience a DC offset change, which means that the channel impulse response estimate may be corrupted, and the other signal's channel impulse response will be used for the data estimation by means of switch 280 controlled by decision unit 260. If the two mean square error signals are approximately equal, then neither of the two channel impulse response estimates should be corrupted, and the average of the two estimates can be used for the data estimation by means of switch 280 controlled by decision unit 260.

Figure 3:
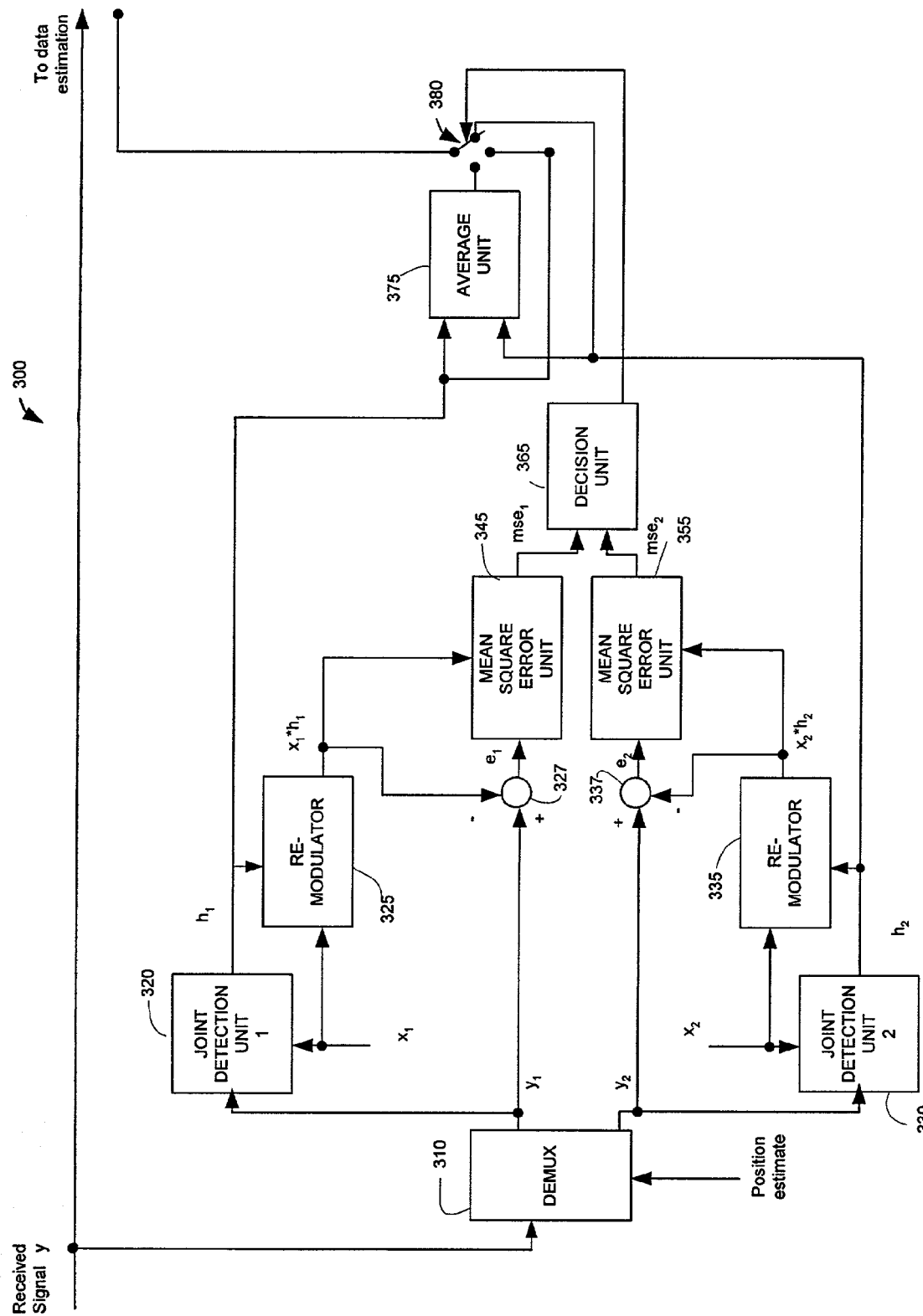
FIG. 3 shows a more detailed block diagram of another specific embodiment according to the present invention.

FIG. 3 shows the arrangement of another specific embodiment of the present invention. Incoming signal y is fed to the data estimation and to the input of demultiplexer 310. Demultiplexer 310 receives a position estimate input signal which determines the split position for generating the two output signals $y_1$ and $y_2$. Split signal $y_1$ is fed to joint detection unit 320 which also receives the known training sequence $x_1$. A re-modulator 325 receives the output signal $h_1$ from joint detector unit 320 and the training sequence $x_1$ to generate $x_1*h_1$, which is fed to subtractor 327 and to calculation unit 345. Subtractor 327 also receives signal $y_1$ (from demultiplexer 310), from which signal $x_1*h_1$ is subtracted to generate error signal $e_1$. Calculation unit 345 receives the error signal $e_1$ and the signal $x_1*h_1$ output from re-modulator 325 to calculate the mean square error $mse_1$, which is fed to decision unit 365. Similarly, split signal $y_2$ is fed to joint detector unit 330 which also receives training sequence $x_2$. Joint detector unit 330 generates output signal $h_2$ which is fed to re-modulator 335, which also receives the training sequence $x_2$. Re-modulator 335 then generates output signal $x_2*h_2$ which is fed to subtractor 337 and to calculation unit 355. Subtractor 337 receives the input signal $y_2$ from which the signal $x_2*h_2$ output by re-modulator 335 is subtracted to generate error signal $e_2$ which is fed to calculation unit 355. Calculation unit 355 calculates the second mean square error $mse_2$ which is fed to decision unit 365. Decision unit 365 controls the position switch 380. Switch 380 receives three input signals: the output signal from joint detector unit 320, the output signal from joint detector unit 330, and the output signal of average unit 375 which averages the output signals from joint detection units 320 and 330.

Again, first the received signal y is demultiplexed into two parts $y_1$ and $y_2$, synchronized to the first and the last N symbols of the training sequence. This operation needs as input a position estimate, which can be established, for example, through a conventional correlation method. The first part $y_1$ is then applied to the joint detection algorithm together with the first part of the training sequence $x_1$. The joint detection algorithm returns a joint estimate of the DC and the channel impulse response in the vector $h_1$ as will be explained in more detail below. This estimate $h_1$ is subsequently re-modulated with $x_1$ which gives an estimate of the received signal:

$$\hat{y}_{1n} = h_{1n} * x_{1n} = \sum_{k=1}^{L} h_{1k} x_{1n-k}. \quad (1)$$

The difference between the received signal and the estimated received signal is the error signal $e_1$. L represents the length of the channel impulse response in symbols.

$$e_{1n} = y_{1n} - \hat{y}_{1n} \quad (2)$$

The error signal $e_1$ and the estimated received signal are then used to calculate the normalized mean square error $mse_1$ given as:

$$mse_1 = \frac{\sum_{k=1}^{N} |e_{1n}|^2}{\sum_{k=1}^{N} |\hat{y}_{1n}|^2} \qquad (3)$$

A similar procedure is also performed for $y_2$, which yields $h_2$ and $mse_2$. The two mean square error signals are input to a decision device 365 which determines whether $h_1$, $h_2$, or the average of $h_1$ and $h_2$ should be used for the data estimation. The output of decision device 365 is thus used to control switch 380 which feeds the appropriate channel impulse response and DC on to the data estimator (not shown in the figures).

An exemplary method of implementing a joint detection unit will now be explained. Such a joint detector can be represented by a simplified matrix notation. Therefore, the received baseband signal y can be written as $$y_n = \sum_{k=1}^{L} h_k x_{n-k} + w_n + dc \qquad (4)$$

where $y_n$ is the received symbol, $x_n$ is the transmitted symbol, $h_k$ is the channel coefficient, $w_n$ is white Gaussian noise and dc is a constant DC offset.

This can be represented as a linear equation system:

$$Y = XH \qquad (5)$$

where $$Y = \begin{bmatrix} y_n \\ y_{n+1} \\ \vdots \\ \cdot \\ y_{n+T+L-1} \end{bmatrix}, \quad X = \begin{bmatrix} x_n & \cdots & & \\ \vdots & \ddots & \vdots & \vdots \\ \vdots & & x_n & \vdots \\ \vdots & & \vdots & \vdots \\ x_{n+T} & & \vdots & \vdots \\ \vdots & \ddots & \vdots & \vdots \\ x_{n+T+L-1} & \cdots & & 1 \end{bmatrix}, \quad H = \begin{bmatrix} h_1 \\ h_2 \\ \vdots \\ h_L \\ dc \end{bmatrix} \qquad (6)$$

where $x_n \ldots x_{n+T}$ are the training symbols, and $y_n \ldots y_{+T}$ are the corresponding received symbols. T represents the total number of training symbols used for the joint detection. In this case H can be determined by a least square solution.

$$H = (X^H X)^{-1} X^H Y \qquad (7)$$

where $(\ )^H$ denotes a Hermitian transposition. Other suitable methods to solve equation 5 can be used.

The description above describes specific embodiments, and it is understood that the present invention is not necessarily limited to the described embodiments. Variations or modifications of the described embodiments could be made without departing from the scope of the invention. The scope of the invention is to be limited only by the issued claims.

What is claimed is:

1. A digital arrangement for selecting a channel coefficient and DC estimate comprising:
   a demultiplexer receiving a digital input signal and splitting said digital input signal into a first and second signal;
   a first joint detection unit receiving the first signal and generating a first channel coefficient and DC estimate;
   a second joint detection unit receiving the second signal and generating a second channel coefficient and DC estimate;
   a first and second error determination unit receiving the first and second channel coefficients and DC estimates, respectively for generating a first and second error signal;
   a decision unit receiving the first and second error signals and generating a control signal; and
   a selection unit selecting the first or second channel coefficient and DC estimate under the control of the control signal.

2. The digital arrangement according to claim 1, further comprising an average unit receiving the first and second coefficients and DC estimates far generating an average channel coefficient and DC estimate, wherein the selection unit selects the first, second or average channel coefficient and DC estimate.

3. The digital arrangement according to claim 1, wherein each of the first and second error determination units comprises a re-modulator receiving the respective first or second coefficient and DC estimate and a training signal for generating a re-modulated signal.

4. The digital arrangement according to claim 3, wherein each of the first and second error determination units further comprises a subtractor for subtracting the re-modulated signal from the respective first or second signal for generating an error signal.

5. The digital arrangement according to claim 4, wherein each of the first and second error determination units further comprises a mean square error unit receiving a sequence of the error signal and the re-modulated signal for generating a mean square error signal, wherein the mean square error signal is fed to the decision unit.

6. The digital arrangement according to claim 5, wherein the demultiplexer receives a position estimate signal for splitting the digital input signal.

7. The digital arrangement according to claim 6, wherein the position estimate signal is generated by correlation.

8. The digital arrangement according to claim 1, wherein the digital arrangement is implemented within a digital signal processor.

9. A method of selecting a channel coefficient and DC estimate for a signal estimation comprising the steps of:
   splitting an incoming digital signal into a first and second signal;
   determining a first and second channel coefficient and DC estimate with respect to the first and second signals;
   determining a first and second error signal with respect to the first and second channel coefficients and DC estimates, comprising the step of re-modulating a training signal with the first or second channel coefficient and DC estimate for generating a re-modulated signal; and
   selecting the first or second channel coefficient and DC estimate depending on the first and second error signals.

10. The method according to claim 9, wherein a mean square error signal is generated from the first or second error signal.

11. The method according to claim 9, further generating an average channel coefficient and DC estimate from said first and second channel coefficients and DC estimates and wherein the step of selecting comprises the step of selecting the first, second or average channel coefficient and DC estimate.

12. The method according to claim 9, wherein splitting of the incoming digital signal is performed depending on a position estimation signal.

13. The method according to claim 12, wherein the position estimation signal is generated by correlation.

14. A wireless communication apparatus having a digital arrangement for selecting a channel coefficient and DC estimate comprising:
  a demultiplexer receiving a digital input signal and splitting said digital input signal into a first and second signal;
  a first joint detection unit receiving the first signal and generating a first channel coefficient and DC estimate;
  a second joint detection unit receiving the second signal and generating a second channel coefficient and DC estimate;
  a first and second error determination unit receiving the first and second channel coefficients and DC estimates, respectively for generating a first and second error signal;
  a decision unit receiving the first and second error signals and generating a control signal; and
  a selection unit controlled by the control signal for selecting the first or second channel coefficient and DC estimate.

15. The wireless communication apparatus according to claim 14, further comprising an average unit receiving the first and second coefficients and DC estimates for generating an average channel coefficient and DC estimate, wherein the selection unit selects the first, second or average channel coefficient and DC estimate.

16. The wireless communication apparatus according to claim 14, wherein each of the first and second error determination units comprises a re-modulator receiving the respective first or second channel coefficient and DC estimate and a training signal for generating a re-modulated signal.

17. The wireless communication apparatus according to claim 16, wherein each of the first and second error determination units further comprises a subtracter for subtracting the re-modulated signal from the respective first or second signal for generating an error signal.

18. The wireless communication apparatus according to claim 17, wherein each of the first and second error determination units further comprises a mean square error unit receiving a sequence of the error signal and the re-modulated signal for generating a mean square error signal, wherein the mean square error signal is fed to the decision unit.

19. The wireless communication apparatus according to claim 18, wherein the demultiplexer receives a position estimate signal for splitting the digital input signal.

20. The wireless communication apparatus according to claim 19, wherein the position estimate signal is generated by correlation.

21. The wireless communication apparatus according to claim 14, wherein the digital arrangement is implemented within a digital signal processor.

22. A method of selecting a channel coefficient and DC estimate for a signal estimation comprising the steps of:
  splitting an incoming digital signal into a first and second signal;
  determining a first and second channel coefficient and DC estimate with respect to the first and second signals;
  generating an average channel coefficient and DC estimate from said first and second channel coefficients and DC estimates, determining a first and second error signal with respect to the first and second channel coefficients and DC estimates; and
  selecting the first, second or average channel coefficient and DC estimate depending on the first and second error signals.

* * * * *